United States Patent Office 2,877,373
Patented Mar. 10, 1959

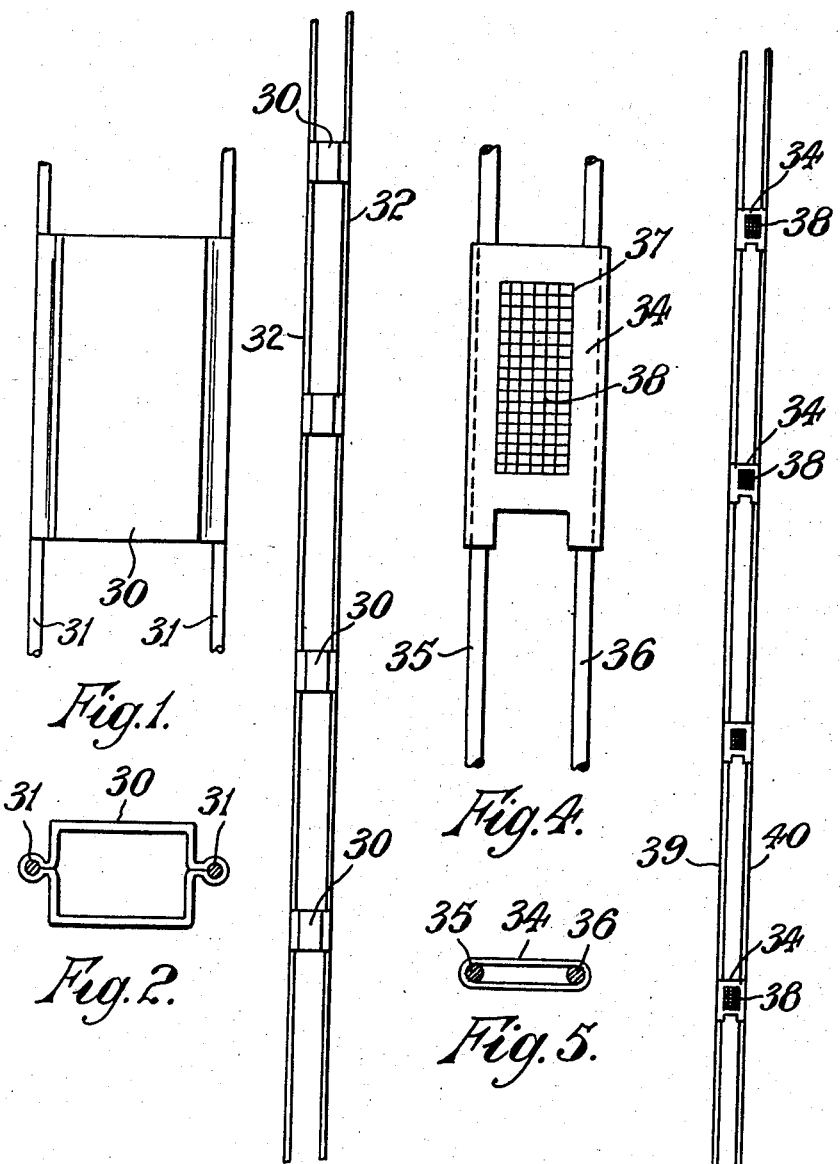

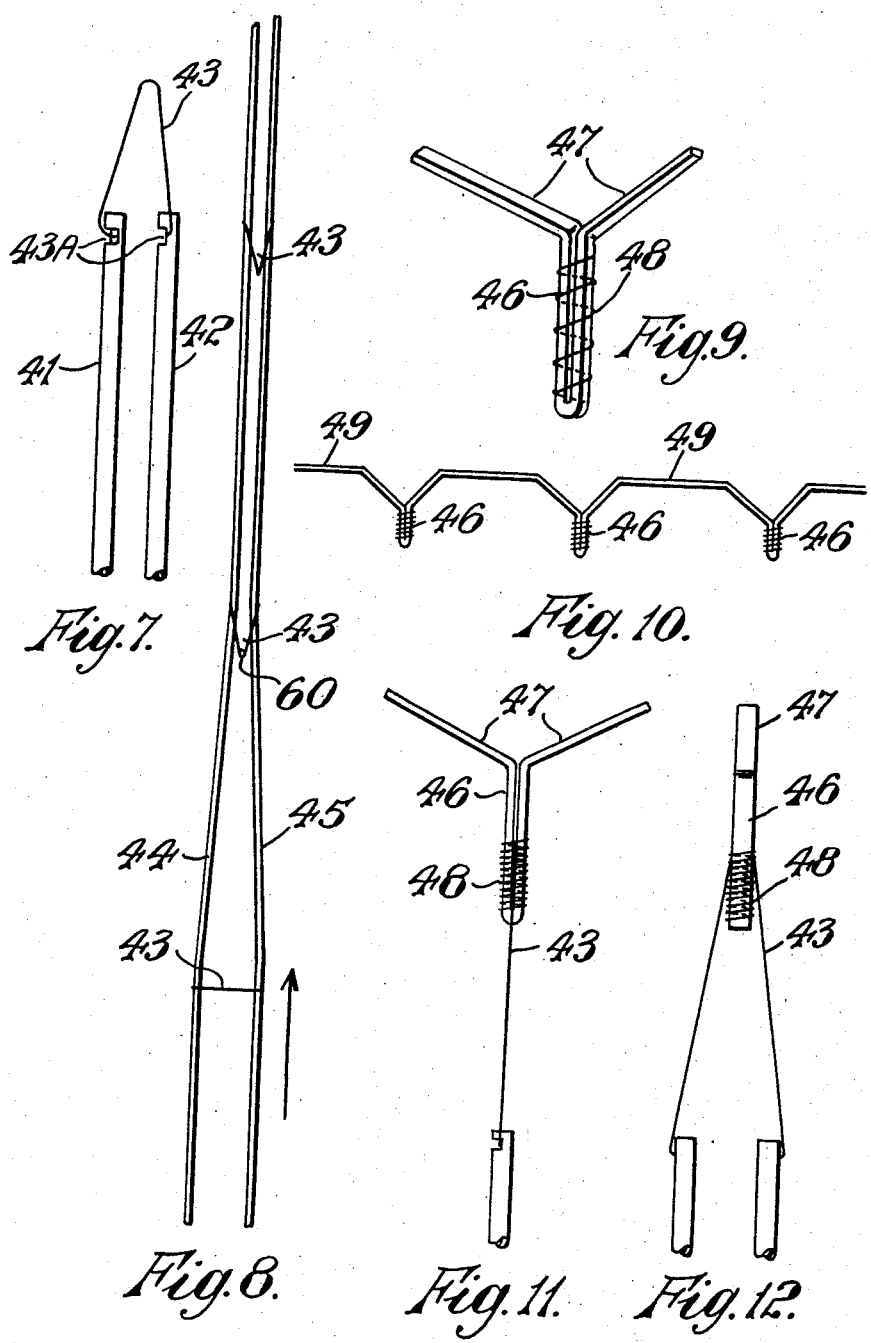

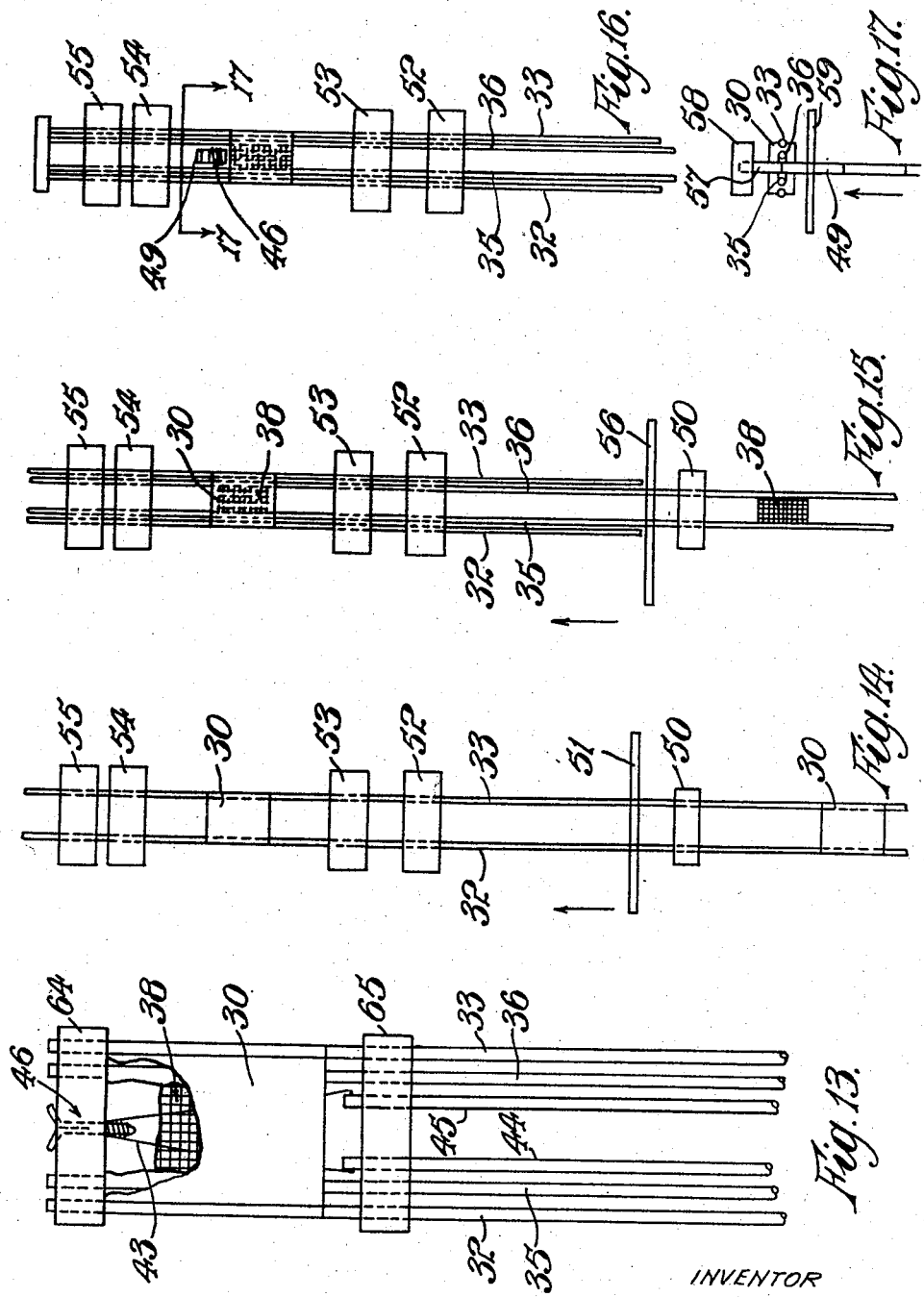

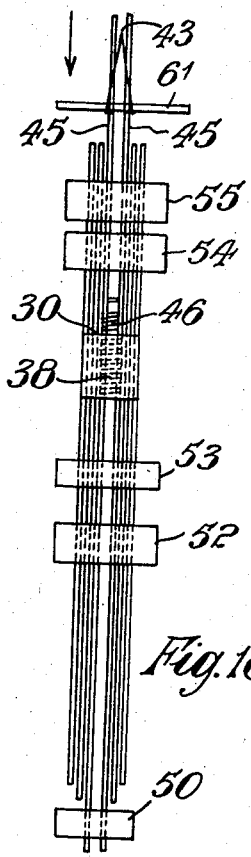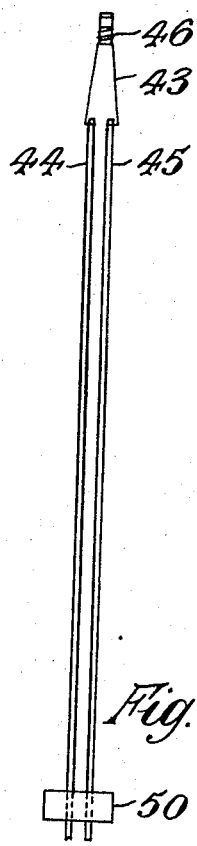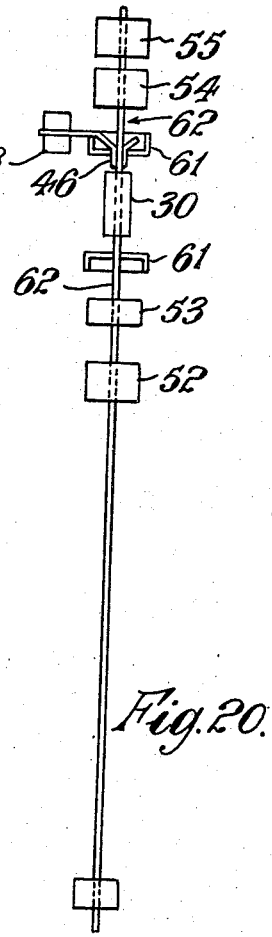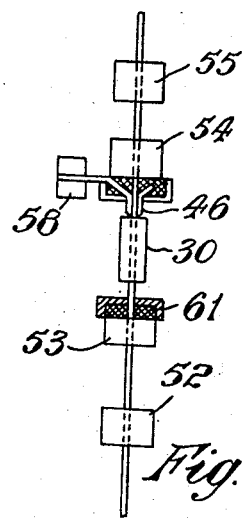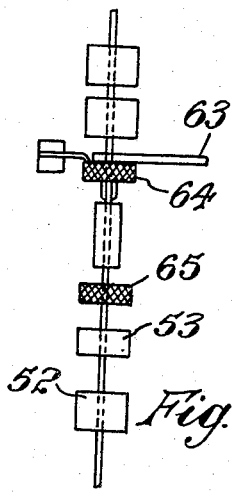

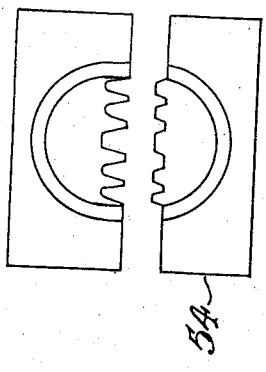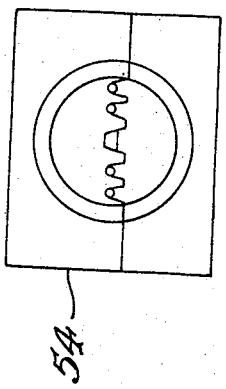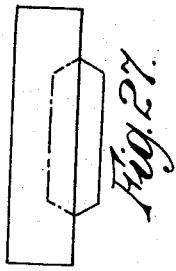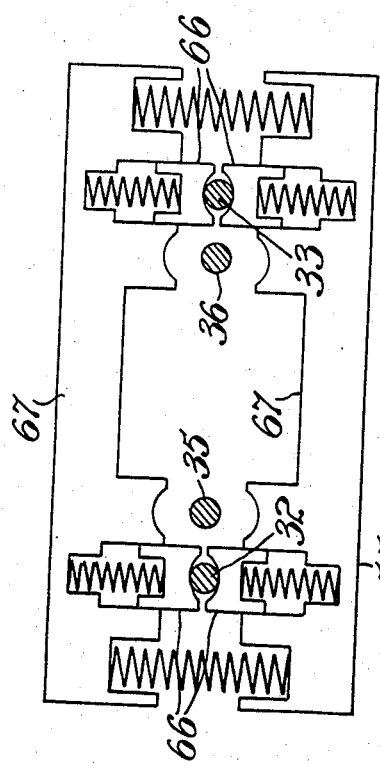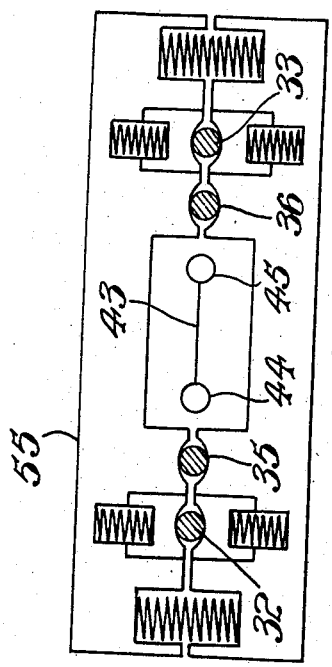

2,877,373

STRUCTURE AND ASSEMBLY METHODS FOR ELECTRODE STRUCTURES OF ELECTRICAL DISCHARGE DEVICES

Alexander R. Rangabe, Baldock, England

Original application November 10, 1949, Serial No. 126,462. Divided and this application March 22, 1952, Serial No. 277,958

9 Claims. (Cl. 313—278)

This application is a division of my co-pending application S. N. No. 126,462, filed on the 10th day of November 1949, now U. S. Patent No. 2,607,114.

While applicable to the manufacture of many related types of electrical devices having cooperating electrodes, the present invention finds particularly advantageous application in the manufacture of electrical discharge devices of the type including a thermionic cathode and one or more cooperating electrodes, such as various of the conventional control, screen, or suppressor grids and an anode. It has for a particular object the provision of an electrode structure and assembly method permitting the rapid, economical and simplified precision manufacture of such devices particularly in large quantity production, as on automatic machinery.

Broadly speaking, the objects of the invention are accomplished by affixing at spaced intervals along the length of a continuous support a plurality of electrodes all of a given type (e. g., all cathodes) and thereafter assembling or partially assembling an electrode structure by inserting into an assembly position or into the portion of the electrode structure already assembled an end portion of said support of length sufficient to include one of the electrodes affixed thereto, and subsequently severing the end portion from the remaining length of support, leaving the severed end portion with its affixed electrode positioned at the assembly position or within the portion of the electrode structure previously assembled. By repeating these steps with successive electrode structures to be assembled while using the successive end portions of the continuous support remaining after the previous severing, a convenient and rapid way of assembling a plurality of electrode structures is provided. Using the same method for other types of electrodes (e. g., grids and anodes) the advantages of the method are compounded for all elements of the electrode structure. More specific aspects of the invention involving, for example, structures and methods for precision positioning and affixing the various electrodes with respect to each other in the final assembly will be related hereinafter.

The features of the invention upon which patent protection is sought are set forth in the appended claims; all of the aspects of the invention together with further objects and advantages thereof will better be understood from the following description of one embodiment thereof, which description is to be taken in conjunction with the accompanying drawings in which:

Figs. 1 and 2 are respectively side and top elevations of a typical anode assembly unit as it appears after assembly in an electrode structure; while the Fig. 3 shows an integrated plurality of such anode units comprising anodes affixed at spaced intervals longitudinally of a pair of supporting wires which are to be successively severed between the anodes as hereinafter described in order to form a plurality of detached anode assembly units as shown in the Figs. 1 and 2;

Figs. 4, 5 and 6 are corresponding views of grid assembly units;

Fig. 7 is a plan view of a filament or cathode assembly unit comprising a filament or cathode attached to its support rods as it appears after insertion into the electrode assembly; while Fig. 8 shows an integrated plurality of such units comprising filaments or cathodes on continuous support wires similar to the Figs. 3 and 6 for the anodes and grids respectively;

Fig. 9 is a plan view of a filament or cathode spring support; while the Fig. 10 illustrates an integrated plurality of such supports formed of a continuous length of strip material to be severed much in the manner of the anode support structure of Fig. 3;

Figs. 11 and 12 are side and front plan views respectively illustrating how the filament of Fig. 7 is supported and tensioned by the support assembly of Fig. 9;

Fig. 13 is an elevation (partly broken away to show the inner electrodes) of an assembled electrode structure;

Figs. 14 through 22 are diagrammatic illustrations of various stages in the assembly of the electrode structure, as by automatic machinery;

While Figs. 23 through 27 are diagrammatic illustrations of various clamping mechanisms and dies, and the position of the various electrode supports therein during certain stages of the assembly operations, as will be more fully explained hereinafter.

Referring first to the Figs. 1, 2 and 3, each anode 30 may be of a tubular form or consist of plates bent transversely to clear the remaining electrodes when all electrodes are assembled together. The anode unit includes affixed supports 31. As shown by the Fig. 3, a plurality of such anode units may be preformed as an integrated structure for the assembly operations later to be described by affixing the individual anodes 30 at spaced intervals longitudinally of a pair of supports, such as parallel rods or wires 32 and 33 which, when severed intermediate anodes 30 form supports 31. Preferably the anodes 30 are welded or similarly affixed to the rods or wires 32 and 33. Rods or wires 32 and 33 are preferably continuous lengths such that they may be severed at points intermediate between the anodes 30 for the purpose of severing or disconnecting an anode unit of the kind shown in the Figs. 1 and 2 during the assembly operation to be described.

The grid structures illustrated by the Figs. 4, 5 and 6 are substantially the same as the anode structures of the Figs. 1, 2 and 3. The principal differences are that the grid assembly unit shown in the Figs. 4 and 5 is of sufficiently smaller size that it may be inserted into the anode structure of the Figs. 1 and 2 with appropriate spacing between the grid and the anode. As shown by the Figs. 4 and 5, the grid assembly unit may comprise any suitable frame 34 affixed as by welding to the support rods 35 and 36 and having apertures 37 therein across which a screen-like grid structure 38 is positioned. As the Fig. 6 indicates, a plurality of these grid assemblies are preformed in an integrated structure as by affixing the frames 34 longitudinally of the support rods 39 and 40 so that the grid assembly units shown in the Figs. 4 and 5 may be manufactured therefrom by severing of the rods 39 and 40 at positions intermediate between the frames 34 during the assembly operations to be described. Rods 39 and 40 thus form support rods 35 and 36.

Referring now to the Fig. 7, the filament or cathode assembly may comprise a pair of support rods 41 and 42 having affixed thereto a filament 43 in the shape of a hairpin and preferably coated with a suitable thermionically emissive material in the usual manner. A plurality of these filament assemblies may be preformed much in the manner of the anode and grid assemblies of Figs. 3 and 6 by attaching or affixing a plurality of such filaments 43 at spaced intervals along the continuous support rods 44 and 45 of Fig. 8 so that individual filament assemblies may be severed from the continuous rod structure as by severing at points intermediate between the filaments 43, all as will be described hereinafter. Preferably these filaments 43 are first affixed across the rods 44 and 45 in a straight position as shown in the lower portion of the Fig. 8. Subsequently and during the assembly operation the rods 44 and 45 will be brought together such that the filaments 43 may assume the hairpin-shape indicated in the upper portion of the Fig. 8. The filament ends may be welded or otherwise affixed to the rods, but preferably the filament ends are inserted in nicks 43A which may be swaged to clinch the ends of each filament to the rods.

Referring now to the Fig. 9, a support structure for the filaments may comprise the U-shaped or forked bar 46 bent into the shape shown such that there are two protruding or splayed-out portions 47 which facilitate subsequent insertion of the filament loop as hereinafter described. About the U-shaped portion there may be provided a spring 48 of coiled, spiral form upon which the filament 43 may rest in the final assembly of the electrode structure in such manner that the spring imparts tension to the filament. The manner of positioning the filament 43 on this support structure is better illustrated by the Figs. 11 and 12. For providing a convenient way of supplying a plurality of such support structures to the electrode structure during the assembly operation, the support structures may be formed of a continuous integrated strip 49, as shown in the Fig. 10, such that the individual supporting structures may be separated from the continuous strip by severing at intermediate points during the assembly operation.

With the foregoing description of elements in mind, the successive steps in the assembly of an electrode structure, including for example an anode, one or more grids and a filament or cathode, may be visualized by considering the Figs. 14 through 22.

The first step of assembling an anode is illustrated by the Fig. 14. The end portion of the structure shown in the Fig. 3 is fed in the direction of the indicated arrow through the following instrumentalities, all of which are in an open position to receive the continuous strip of anode sections: a gripper 50 which will grasp the rods 32 and 33, a knife or like shearing means 51 which will sever the rods 32 and 33 when operated, a guiding clamp 52 for guiding the continuous anode structure into position, male dies 53 and 54 for purposes to be explained, and a second guide clamp 55 (Fig. 23) adapted to engage the rods 32 and 33. After an end portion of the Fig. 3 structure has been moved into the position shown in the Fig. 14, the guide clamp 50 is then closed to grip the anode support rods and the shearing means 51 is operated to sever the rods approximately intermediate anodes 30. Thus the support rods are severed behind each anode after insertion into a suitable assembly position so as to leave the anode with its support rods at that position.

In one preferred way of carrying out the foregoing anode insertion and the following steps a plurality of times for quantity assembly of electrode structures, a rotating table indexing machine may be used in which the different stages in the electrode assembly, or other operations upon the electrode structure, are carried out at angularly spaced points around the periphery of the table which is rotated intermittently so as to carry the progressively assembled electrode structures to each of the points in turn, and the steps in the assembly or operation are carried out at those points simultaneously during the pauses between the intermittent rotations of the table. Thus a plurality of electrode assemblies may be at various stages of assembly around the table at any one instant.

After an anode with its support rods has been inserted as just described, the table may be turned until the anode structure is brought opposite the next feeding point where a grid structure with its support rods shown in the Fig. 6 is inserted inside the anode as better illustrated by the steps of Fig. 15. The end of the preformed grid structure shown in the Fig. 6 is next fed into the machine in the direction of the arrow in Fig. 15 so that they slide into appropriate guiding grooves in the guide clamps 52 and 55 between those already occupied by the anode support rods until the grid is located inside the previously inserted anode. Thus the grid is fed in through the following instrumentalities all in open position: the gripper 50, the shearing means 56, the guide clamp 52, male die 53, anode 30, male die 54, and guide clamp 55. Fig. 23 is a diagrammatic sectional view of the guide clamp 55 at this stage where the anode support rods are spring held and the grid support rods 32 and 33 are ready to be gripped. The guide clamp 52 is similar to that shown in Fig. 23 but is not provided with the spring-loaded jaws for holding the anode support rods. In the position shown in the Fig. 15 the guide clamp 55 closes to grip the grid rods 35 and 36 and the knife means 56 cuts them off. The grid support rods 35 and 36 are thus severed at approximately the same level as the anode rods 32 and 33 in the machine leaving the inserted lengths of grid support rods projecting toward the center of rotation of the table and parallel and close to the anode support rods. In the case of a multi-grid electrode structure this step of assembly may be repeated, employing, of course, grid structures of appropriately smaller dimension.

In order to facilitate the assembly of the filament or cathode and its support rods at the following stage of assembly, the grid (or the inner grid where there are several) is preferably of flattened tubular cross-section and can be a mesh with unperforated portions along its edges adjacent the support rods so that these unperforated portions form channels to guide the filament support rods when the latter are inserted inside the grid structure at a subsequent stage in the assembly. Alternatively a wound grid can be so shaped as to provide clearances for the filament support rods adjacent to the grid support rods.

After the anode and grid, or grids, have been assembled in the manner already described, the table is rotated to a third position at which the steps illustrated by the Figs. 16 and 17 are performed. These steps involve the insertion of a spring support for the filament loop by use of the constructions illustrated by the Figs. 9 and 10. As already indicated, the spring supports can be made from a continuous length of strip by doubling the strip upon itself at intervals and winding a spring around the doubled part, as illustrated by the Fig. 10. In this condition, the supports are ready for feeding into the assembly machine as indicated schematically by the Figs. 16 and 17. The Fig. 16 is a similar view to that of the Figs. 14 and 15, namely, a side view of the assembly; while Fig. 17 is a cross-section along the line 17—17 illustrating how one end of the continuous strip 49 of the Fig. 10 passes transversely through and between the structure of the various anode and grid support rods. The support is fed in the direction of the arrow in the Fig. 17 and one arm 57 of the support is held in a vise or gripper 58 while the support is severed from the remaining length by a suitable knife or shearing means 59.

Next, the machine is rotated until the assembly comes opposite another or fourth point of rotation at which the filament is fed into the machine by the steps best illustrated by the Figs. 18 and 19. As the continuous support rods 44 and 45 with the filaments secured between them at spaced intervals, are fed forward to the machines, the rods are caused to approach one another as shown in the Fig. 8 and the loop of filament thereby formed may be engaged by a suitable spring-loaded member 60 (Fig. 8) which automatically tests the strength of the filament anchorages to the rods and causes the filament to assume a "V" or "hairpin" shape. As the filament support rods continue their forward motion in the direction indicated by the arrows in Figs. 8 and 18, their ends enter the machine and act after the manner of needles to assist in threading the filaments inside the grids. This is illustrated diagrammatically by the Fig. 18. The filament 43 on its support rods 44 and 45 is fed in the direction of the arrow through the guide clamp 55 and male die 54, between splayed portions 47 of spring support 46, through the previously inserted grid, male die 53, guide clamp 52 and gripper 50. After the rods have been inserted sufficiently to reach the gripper 50, they are cut through by shearing means 61 behind the points of filament anchorage and the cut off portions of the support rods carrying the hairpin filament, are drawn into the assembly of the closed gripper 50 until the bend of the filament enters the forked resilient supports 46 over the spring thereon which is partly compressed. This position is shown in detail in the Fig. 19 and, to a large scale, in the Figs. 11 and 12. The spring tensions and supports the hairpin filament and the forked bar prevents sidewise movement and locates the loop of the filament centrally within the grid structure. The anchored end of the filament can be arranged to be located centrally within the grid structure by selecting the depths of the nicks used for anchoring the filament ends in the support rods in relation to the final positions of said rods.

After the filament, grid (or grids) and anode have been assembled in the manner above described, they are moved on to the next or fifth position on the table for the performance of the steps illustrated in Figs. 20, 21 and 22 which is a side view of the structure shown in the Fig. 18. Here the guide clamp 52 closes to grip the anode and grid support rods and female split-dies 61 move into position, and fusible insulating material is fed in at positions 62. The fusible insulating material (e. g., glass) is fused, for example, by plain heating and, is illustrated in the Fig. 21, male dies 54 and 53 close to form the fused material into wafers of insulation such as glass which sets on cooling to hold the electrode support rods and the arms of the resilient mounting rigidly in place and in proper relation to one another. The male dies 54 and 53 and the female split-dies 61 retract and the knife 63 (Fig. 22) crops off the spare ends of the resilient support and the electrode support rods and the guide clamps 52 open and the completed assembly falls clear under gravity, or, as the table continues its rotational movement, the electrode assembly can be subjected to further processing and can be subsequently enclosed in a glass envelope which is exhausted and sealed.

The aforesaid support rods or extensions thereof are made of a metal which has a coefficient of thermal expansion equivalent to that of glass so that a proper seal may be formed where the said rods or their extensions pass through the envelopes.

The completed electrode assembly is illustrated in the Fig. 13 in which can be seen the anode 30 (partly broken away), a grid 38 (likewise partly broken away), and a filament 43. The upper ends of the anode and grid support rods 32, 33, 35 and 36 and the support 46 are shown held by the top insulating (e. g., glass) wafer 64 molded around them and the lower parts of the rods 32, 33, 35 and 36 with the filament rods 44 and 45 are similarly clamped by the lower wafer 65 molded around and between them.

As already indicated, the Fig. 23 illustrates the guide clamp 55 with the anode rods 32 and 33 held by the spring-loaded jaws 66 with the grid rods 35 and 36 about to be gripped by jaws 67. The Fig. 24 shows the anode and grid rods gripped and with the filament assembly being threaded through the central aperture in the guide clamp. The guide clamp 52 is similar but is not fitted with spring-loaded jaws for the anode rods 32 and 33.

Fig. 25 is a diagrammatic representation of the male dies such as 54. The two halves of the die are shaped and recessed to correspond when closed. As illustrated in Fig. 26, the dies correctly space and hold in place the anode and grid rods and support 46. The male dies 53 are similar to 54 but are shaped to deal with six rods. As shown in full-lines in the Fig. 27, which is a plan view, the male dies 53 and 54 have a tapering, projecting proportion whereas the female dies have a correspondingly shaped recess as shown by the chain-dotted lines instead of the tapering, projecting portion.

The described steps of feeding in and assembling the different electrodes are, of course, all repeated simultaneously during each pause between the rotational movements of the table as it is usual in automatic production by machinery. Modifications may be made in the order of assembly of the grid-anode structure, and, likewise, the methods of feeding the electrode parts into the machine may be different; for instance, the machine can be operated on the conveyor belt principle.

While but a single embodiment of the invention has been disclosed in the foregoing, it will be understood that numerous modifications will occur to those skilled in the art. All such as fall within the true spirit and scope of the invention are intended to be included in the scope of the appended claims.

What is claimed is:

1. A resilient support for a filament of an electron discharge device comprising a U-shaped member and a helical spring surrounding the same for exerting tension on a filament loop inserted within said member.

2. A resilient support for a filament of an electron discharge device comprising a U-shaped member and a helical spring surrounding the same for exerting tension on a filament loop inserted within said member, one end of the spring being affixed to the member near its apex.

3. A resilient support for a filament of an electron discharge device comprising a U-shaped member and a helical spring surrounding the same for exerting tension on a filament loop inserted within said member, the member having splayed out portions protruding from the ends of its side arms for guiding insertion of the filament loop.

4. A resilient support for a filament of an electron discharge device comprising a U-shaped member and a helical spring surrounding the same for exerting tension on a filament loop inserted within said member, the member having splayed out portions protruding from the ends of its side arms for guiding insertion of the filament loop, one end of the spring being affixed to the member near its apex.

5. For use in manufacturing filament supports, an elongated rod bent along its length into a plurality of U-shaped members, and a helical spring surrounding each member and having one end affixed to the member near its apex.

6. For use in manufacturing filament supports, an elongated rod bent along its length into a plurality of U-shaped members having splayed out portions protruding from the ends of the side arms, and a helical spring surrounding each member and having one end affixed to the member near its apex.

7. An electron discharge tube electrode assembly having affixed therein a resilient filament support comprising a U-shaped member having splayed out portions protruding from its side arms, a helical spring surrounding the member and having one end affixed to the member near its apex, and a V-shaped filament having its ends fixed and its apex passing through the member and resting on the other end of the spring.

8. A tube as in claim 7 wherein the space between the arms of the U-shaped member is only slightly wider than the thickness of the filament to ensure accurate location of the filament with respect to the other electrodes.

9. A tube as in claim 7 in which the splayed out portions are sealed within a body of glass which also seals the supports for the other electrodes of the assembly.

No references cited.